(12) United States Patent
Neumann et al.

(10) Patent No.: US 11,866,305 B2
(45) Date of Patent: Jan. 9, 2024

(54) METHOD FOR OPERATING A VEHICLE CRANE

(71) Applicant: Tadano Demag GmbH, Zweibrücken (DE)

(72) Inventors: Marc Neumann, Zweibrücken (DE); Jürgen Schröder, Zweibrücken (DE); Laurent Muller, Butten (FR); Mathieu Ragot, Bitche (FR)

(73) Assignee: Tadano Demag GmbH, Zweibrücken (DE)

( * ) Notice: Subject to any disclaimer, the term of this patent is extended or adjusted under 35 U.S.C. 154(b) by 15 days.

(21) Appl. No.: 17/620,471

(22) PCT Filed: Jun. 16, 2020

(86) PCT No.: PCT/EP2020/066642
§ 371 (c)(1),
(2) Date: Dec. 17, 2021

(87) PCT Pub. No.: WO2020/254332
PCT Pub. Date: Dec. 24, 2020

(65) Prior Publication Data
US 2022/0259015 A1  Aug. 18, 2022

(30) Foreign Application Priority Data
Jun. 21, 2019 (DE) .......................... 102019116759.0

(51) Int. Cl.
*B66C 13/46* (2006.01)
*B60R 1/27* (2022.01)
(Continued)

(52) U.S. Cl.
CPC .............. *B66C 13/46* (2013.01); *B60R 1/27* (2022.01); *B66C 23/905* (2013.01); *H04N 5/272* (2013.01);
(Continued)

(58) Field of Classification Search
CPC ......... B66C 13/46; B66C 23/905; B60R 1/27; B60R 2300/102; B60R 2300/304;
(Continued)

(56) References Cited

U.S. PATENT DOCUMENTS

2016/0024758 A1   1/2016  Ishimoto et al.
2019/0367339 A1*  12/2019  Backes .................. B66C 23/76
(Continued)

FOREIGN PATENT DOCUMENTS

DE     102016004382 A1   10/2017
DE     112016000127 B4    6/2019
(Continued)

OTHER PUBLICATIONS

Preliminary Report on Patentability of the International Searching Authority in English from corresponding Patent Cooperation Treaty (PCT) Application No. PCT/EP2020/066642, completed Dec. 21, 2021.
(Continued)

*Primary Examiner* — Farzana Hossain
(74) *Attorney, Agent, or Firm* — Gardner, Linn, Burkhart & Ondersma LLP

(57) ABSTRACT

A method for operating a vehicle crane having a lower chassis with boom supports and having an upper chassis with a counterweight in which a live view of the surroundings of the vehicle crane is displayed to the driver. To provide a possibility of operating the vehicle crane that permits safe and simplified manuvering and use, the live view is created at least by way of cameras arranged on the lower chassis, markings indicating the movement ranges of the boom supports and the pivot range of the upper chassis are superimposed to scale on the live view, where the
(Continued)

markings are hard-programmed crane-specific overlays and the live view is a crane-specific view that is calibrated with regard to dimensions.

13 Claims, 2 Drawing Sheets

(51) Int. Cl.
*B66C 23/90* (2006.01)
*H04N 5/272* (2006.01)
*H04N 7/18* (2006.01)
*H04N 23/90* (2023.01)
*H04N 23/698* (2023.01)

(52) U.S. Cl.
CPC ........... *H04N 7/181* (2013.01); *H04N 23/698* (2023.01); *H04N 23/90* (2023.01); *B60R 2300/102* (2013.01); *B60R 2300/304* (2013.01)

(58) Field of Classification Search
CPC ...... H04N 5/272; H04N 7/181; H04N 23/698; H04N 23/90
See application file for complete search history.

(56) References Cited

U.S. PATENT DOCUMENTS

| | | | |
|---|---|---|---|
| 2020/0048052 A1* | 2/2020 | Lyngbäck | G06T 19/006 |
| 2021/0253405 A1* | 8/2021 | Minami | B66C 13/48 |

FOREIGN PATENT DOCUMENTS

| | | |
|---|---|---|
| EP | 2570556 A1 | 3/2013 |
| EP | 3235773 A2 | 10/2017 |

OTHER PUBLICATIONS

"SurroundEye system to support driving safety", published by Clarion Europe GmbH, Webpage https://www.clarion.com/de/de/products-business/surroundeye/, 1 page, retrieved Dec. 18, 2021.

"The Motec camera-based driver assistance system with 360 degree all-round view", published by Motec GmbH, Webpage https://www.motec-cameras.com/rundumsichtsystem/, 1 page, retrieved Dec. 18, 2021.

"3D smart sensor O3M", published by ifm electronic GmbH, Webpage https://www.ifm.com/de/de/shared/technologien/3d-smart-sensor-o3m/3d-smart-sensor-03m, 1 page, retrieved Dec. 18, 2021.

* cited by examiner

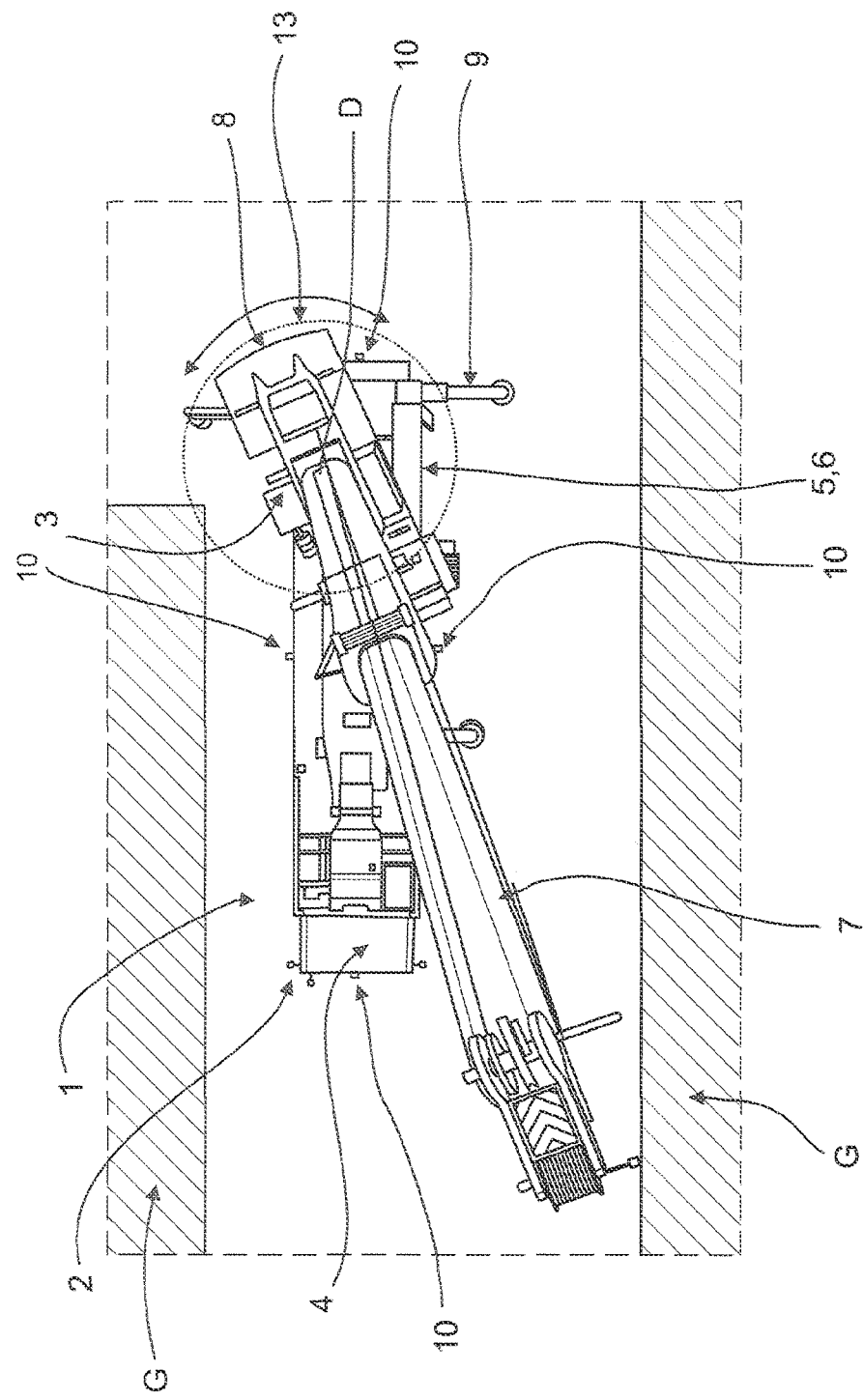

METHOD FOR OPERATING A VEHICLE CRANE

CROSS REFERENCE TO RELATED APPLICATION

The present application claims the priority benefits of International Patent Application No. PCT/EP2020/066642, filed Jun. 16, 2020, and claims benefit of German patent application no. DE 10 2019 116 759.0, filed on Jun. 21, 2019.

BACKGROUND AND FIELD OF THE INVENTION

The invention relates to a method for operating a vehicle crane having a lower carriage with jib supports and a superstructure with a counterweight, in which a live view of the surroundings of the vehicle crane is displayed to the driver.

It is known, from the company Clarion Europe GmbH (https://www.clarion.com/de/de/products-business/surroundeye/), to provide a bird's-eye image of the lorry surroundings via a plurality of cameras mounted on the vehicle, said image being displayed on the monitor in the driver's cabin. The system provides such a live view even in regions which are in the driver's blind spot and thus contributes to increased safety when driving and maneuvering.

A camera-based driver-assistance system having a 360° panoramic view is known from the company Motec GmbH (https://www.motec-cameras.com/rundumsichtsystem/). Similar camera systems using active sensor systems are known from the company ifm electronic GmbH (https://www.ifm.com/de/de/shared/technologien/3d-smart-sensor-o3m/3d-smart-sensor-o3m).

In these systems, the current bird's-eye panoramic view is generated by the computerized composition of different views which provide the driver with a live view of the surroundings of the vehicle. Such systems allow surroundings information from sensors to be superposed onto the live view.

DE 10 2016 004 382 A1 discloses the use of building information modelling (BIM) to simulate construction machinery operation, wherein live images are superposed onto the virtual image in order to increase the reality of the simulated reproduction.

Furthermore, patent document DE 11 2016 000 127 B4 already discloses a surroundings-monitoring device for a quarry digger in order to assist the digger driver when loading a dumper truck. To this end, a bird's-eye live image of the quarry digger and its surroundings is displayed to the digger driver on a monitor via cameras arranged on the quarry digger. In this live image, annular spacing ranges are overlaid around the quarry digger which are stored in color. In addition, an individual image in a selectable direction is displayed to the digger driver, e.g. in the direction of the dumper truck to be loaded. Moreover, sensors are arranged on the quarry digger, via which signals are sent to the digger driver when obstacles move into the spacing ranges. Further monitoring devices for diggers which provide the digger driver with live images of the surroundings are described in European laid-open document EP 2 570 556 A1 and laid-open document US 2016/0024758 A1.

Moreover, European laid-open document EP 3 235 773 A2 already describes a further surroundings-monitoring device for a vehicle crane. The vehicle crane typically consists of a lower carriage having jib supports and a superstructure with a counterweight and a telescoping jib. Arranged on the tip of the raised telescoping jib is a stereo camera, by means of which a three-dimensional position of an object in the working region of the vehicle crane can be determined.

SUMMARY OF THE INVENTION

The present invention provides an option for operating the vehicle crane permitting safe and simplified maneuvering and usage, with the provided robust solution also permitting usage in the sometimes harsh environmental conditions of the vehicle cranes.

In accordance with an aspect of the invention, in a method for operating a vehicle crane having a lower carriage with jib supports and a superstructure with a counterweight, in which a live view of the surroundings of the vehicle crane is displayed to the driver, an option for operating the vehicle crane permitting safe and simplified maneuvering and usage is provided by virtue of the fact that the live view is generated at least via cameras arranged on the lower carriage, identifications of the movement ranges of the jib supports and of the pivoting range of the superstructure are superposed, to scale, onto the live view, the identifications are fixed-programmed, crane-specific overlays and the live view is a crane-specific view calibrated in terms of dimensions. The calibrated view is adjusted in terms of distances and sizes of the vehicle crane and its surroundings. The permanently stored movement ranges can thus be overlaid onto the live image to scale. Therefore, for each vehicle crane, movement ranges of its parts, such as superstructure pivoting range, jib support extension lengths etc. are individually and specifically determined (calibrated) and these are permanently stored in the controller for generating the overlays (superpositions). The identifications of the movement ranges of the jib supports and/or identifications of the movement ranges of the superstructure pivoting range are thus fixed-programmed, crane-specific overlays.

It has been recognized in accordance with the invention that when the identifications of the movement ranges of the crane or its parts are superposed to scale onto the live view, it is possible to display to the driver in a simple manner whether the crane or its parts can be positioned or moved in the surroundings safely or whether there is a movement restriction.

In other words, permanently predetermined and set markings are displayed on or overlaid onto the live image which identify the corresponding movement range and so the driver can readily recognize whether e.g. a rotation of the superstructure would lead to the counterweight striking against the wall of a house or whether e.g. the jib supports can only be extended half-way without colliding with an obstacle. The invention can do this without additional sensor systems which may also be prone to malfunction under the usage conditions and require additional maintenance.

The identifications for the vehicle crane can include defined, in particular minimum and maximum, movement ranges. For instance, a minimum movement position can be identified e.g. in green and a maximum movement position can be identified in red. In the overlay, the two identifications would then be superposed onto the live image and so a rapid and safe estimation becomes possible for the driver (or operator).

In a particular preferred embodiment the live view is a 360 degree bird's-eye view, in particular as an overview of the complete vehicle crane within its immediate surroundings. However, it is feasible if the bird's-eye view only shows views of the regions of the crane in which moving components having a potential movement restriction are arranged. For instance, a 270 degree front and rear view may be sufficient. It may be useful if the center point of the bird's-eye view is the crane longitudinal and transverse center point of the vehicle crane.

The term "vehicle crane" is understood in the present document to mean mobile cranes having telescoping jibs or crawler cranes with lattice mast jibs.

Further details of the invention will become clear from the following description of exemplified embodiments by reference to the drawings.

BRIEF DESCRIPTION OF THE DRAWINGS

FIG. 2 shows a schematic, bird's-eye live view of a vehicle crane having overlaid identifications for the movement range of the superstructure in the region of the counterweight.

DETAILED DESCRIPTION OF THE PREFERRED EMBODIMENTS

Figure 1:
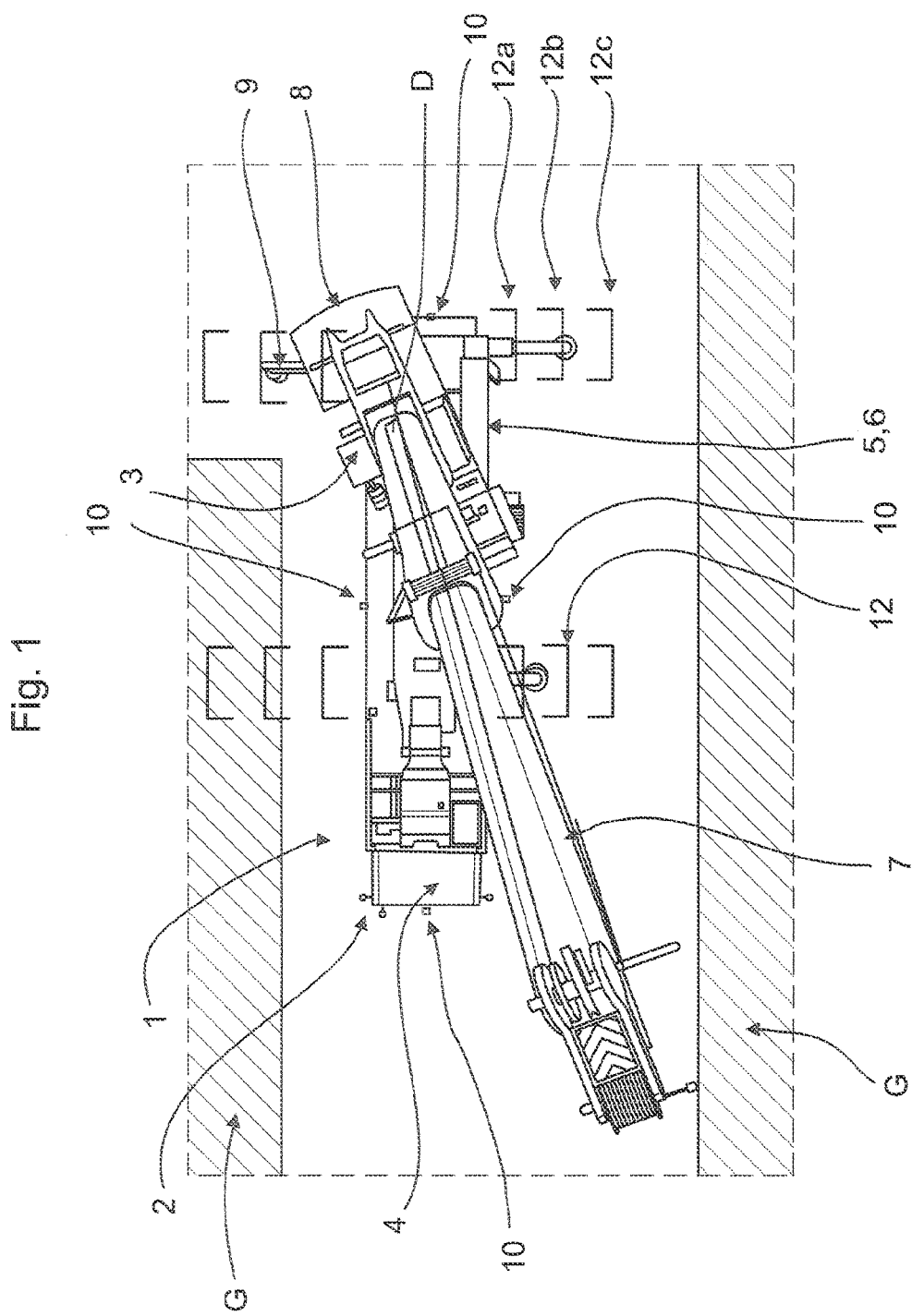
FIG. 1 shows a schematic, bird's-eye live view of a vehicle crane having overlaid identifications for the movement ranges of the jib supports.

The figures each show a schematic bird's-eye live view of the surroundings of a vehicle crane designated as a whole by numeral 1.

The vehicle crane 1 comprises a lower carriage 2 and a superstructure 3. The lower carriage 2 comprises a driver's cabin 4 and six axles 5 each with two rubber-tired wheels 6 suitable for road travel. The lower carriage 2 can naturally comprise more or less than six vehicle axles 5 or alternatively can comprise a crawler track. The superstructure 3 is mounted on the lower carriage 2 in such a manner as to be pivotable about a vertically orientated axis of rotation D. The superstructure 3 and lower carriage 2 can alternatively also be rigidly mounted one on the other. A main jib 7 is arranged on the superstructure 3 which can pivot about the vertical axis D, this main jib being designed as a telescoping jib. A projecting counterweight 8 is arranged on the side of the superstructure 3 facing away from the main jib 7.

The lower carriage 2 comprises in each case two jib supports 9 which can be extended to the left and two jib supports 9 which can be extended to the right.

The bird's-eye live view is a view of the surroundings of the vehicle crane 1 which is calibrated in terms of dimensions and scale and is generated by a computer in a controller, not shown, from—in the present case—four cameras 10 which are arranged at the front, rear and on both sides of the lower carriage 2 of the vehicle crane 1. In larger vehicle cranes, further cameras, e.g. two for each long side, can be used as required in order to obtain the 360 degree coverage. The bird's-eye live view is always generated only from a calibrated view of the vehicle crane 1. Moreover, the bird's-eye live view is only "live" in relation to the immediate surroundings around the vehicle crane 1 which covers the working region of the vehicle crane 1. In the live view, the plan views of the vehicle crane 1 are per se only symbolic photos which are only intended to illustrate the situation. In the present FIGS. 1 and 2, a vehicle crane 1 having a raised jib 7 is shown. In reality or the actual implementation of the invention, the vehicle crane 1 is shown from above in the condition for travelling on roads with a stowed jib 7. Therefore, the driver of the vehicle crane 1, when arriving onto the construction site, can immediately correctly orientate his vehicle crane 1 for positioning the jib supports 9. In order to be able to illustrate the pivoting range of the superstructure 3 with the identification 13, it is also feasible to load another symbolic illustration of the vehicle crane 1 from a file. However, the identification 13 could also be illustrated in the symbolic illustration of the vehicle crane 1 in the condition for travelling on roads as an overlay. A true "live image" of the vehicle crane 1 per se is not provided.

In this live view, markings in the form of identifications 12, 12b, 12c for the movement ranges of the jib supports 9 or for the movement range of the projecting counterweight 8 of the superstructure 3, which range occurs during pivoting of the superstructure 3, are overlaid or superposed.

The movement data, required for this purpose, of the jib supports 9 and of the pivoting movement of the counterweight 8 have been determined differently or specifically for each crane and are permanently stored so that they can be superposed onto the live image to scale.

Therefore, for each crane, movement ranges of the pivoting range of the superstructure 8 and the extension lengths of the jib supports 9 are individually and specifically determined and these are permanently stored in the controller for generating the overlays (superpositions). The identifications of the movement ranges are thus fixed-programmed, crane-specific overlays.

For instance, in FIG. 1 an identification 12a, b, c for the minimum and maximum and middle extension lengths are shown in green, red and yellow for each of the four jib supports 9. In addition, the identifications can also contain extension length details in meters.

In FIG. 2, an identification 13 for the pivoting range of the superstructure 8 is shown as a circle around its axis of rotation D.

It can be seen that the illustration in accordance with the invention allows the driver or operator to immediately recognize that the jib supports 9 on the right in the direction of travel cannot be extended more than minimally without a collision with the building G.

It can also be seen that there is likewise a risk of collision with the building G for the counterweight 8 when rotating the superstructure in the counterclockwise direction to approximately 11 o'clock.

The invention claimed is:

1. A method for operating a vehicle crane having a lower carriage with jib supports and a superstructure with a counterweight, said method comprising:
displaying a live view of the surroundings of the vehicle crane to a driver or operator of the vehicle crane, wherein the live view is generated at least via cameras arranged on the lower carriage, wherein identifications of the movement ranges of the jib supports and of the pivoting range of the superstructure are superposed, to scale, onto the live view, and wherein the identifications are fixed-programmed, crane-specific overlays and the live view is a crane-specific view calibrated in terms of dimensions.

2. The method as claimed in claim 1, wherein the live view is a 360 degree bird's-eye view.

3. The method as claimed in claim 2, wherein the center point of the bird's-eye view is a longitudinal and transverse center point of the vehicle crane.

4. The method as claimed in claim 1, wherein the identifications for the vehicle crane include defined movement ranges.

5. The method as claimed in claim 4, wherein the identifications comprise minimum and maximum movement ranges.

6. A method for operating a vehicle crane having a lower carriage with jib supports and a superstructure with a counterweight, said method comprising:

arranging cameras on the vehicle crane;

displaying a live view of the surroundings of the vehicle crane to a driver or operator of the vehicle crane generated by the cameras;

superposing identifications of motion ranges of components of the vehicle crane onto the live view, wherein the identifications are superposed to scale and wherein the identifications are fixed programmed, crane-specific overlays and the live view is a crane-specific view calibrated in terms of dimensions.

7. The method as claimed in claim 6, wherein arranging cameras on the vehicle crane comprises arranging cameras at least on the lower carriage.

8. The method as claimed in claim 6, wherein the components of the vehicle crane comprise the jib supports and the identifications of motion ranges comprise identifications of the movement ranges of the jib supports.

9. The method as claimed in claim 6, wherein the components of the vehicle crane comprise the superstructure, and wherein the identifications of motion ranges comprise identifications of the pivot range of the superstructure.

10. The method as claimed in claim 6, wherein the live view is a 360 degree bird's-eye view.

11. The method as claimed in claim 10, wherein the center point of the bird's-eye view is a longitudinal and transverse center point of the vehicle crane.

12. The method as claimed in claim 6, wherein the identifications for the vehicle crane include defined movement ranges.

13. The method as claimed in claim 12, wherein the identifications comprise minimum and maximum movement ranges.

* * * * *